W. I. SEYMOUR.
METHOD OF MAKING BIFOCAL LENS BLANKS.
APPLICATION FILED JUNE 7, 1909.
1,024,486.
Patented Apr. 23, 1912.
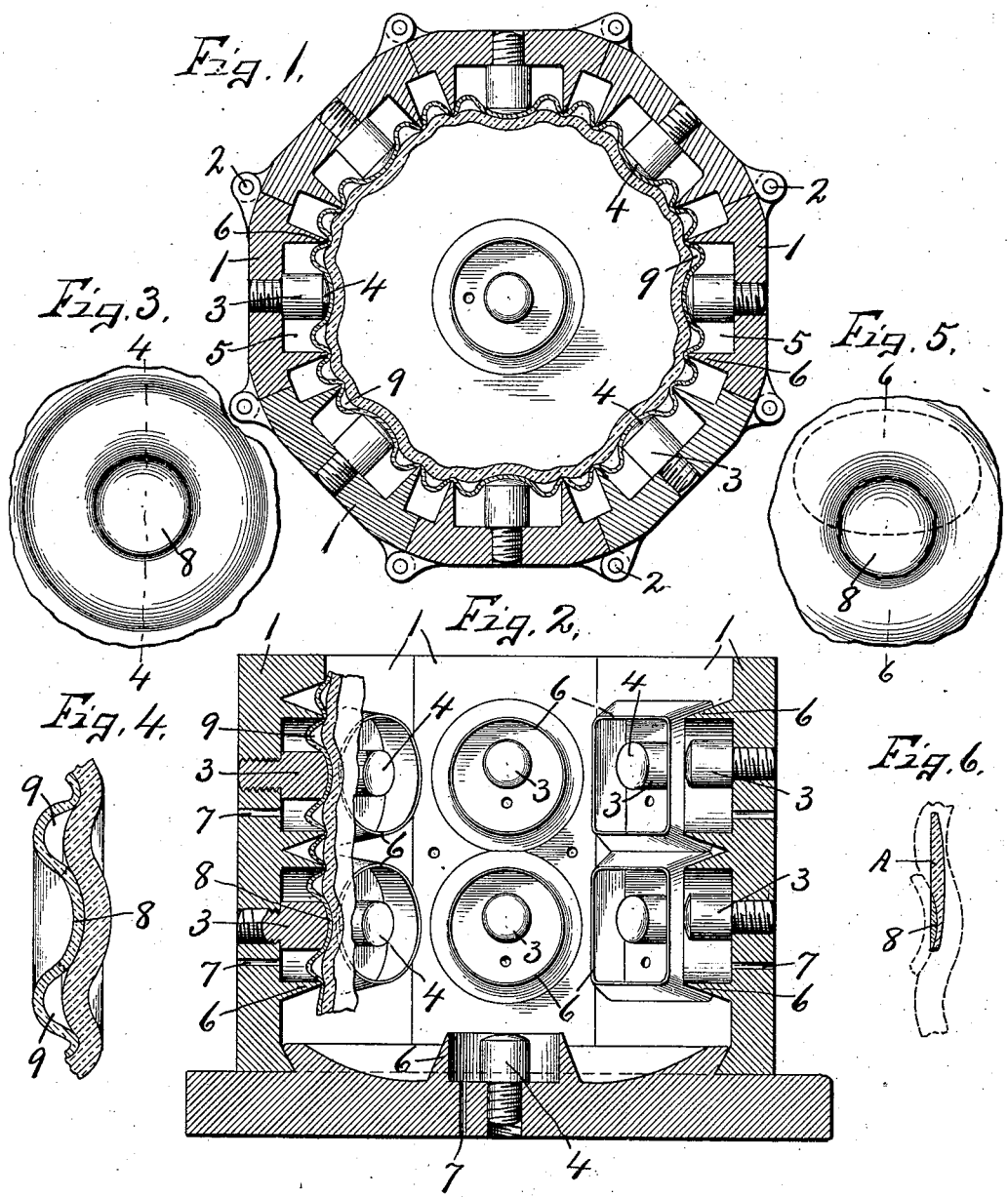

UNITED STATES PATENT OFFICE.

WALTER I. SEYMOUR, OF CHICAGO, ILLINOIS, ASSIGNOR, BY MESNE ASSIGNMENTS, TO UNITED BIFOCAL COMPANY, OF NEW YORK, N. Y., A CORPORATION OF NEW YORK.

METHOD OF MAKING BIFOCAL-LENS BLANKS

1,024,486.   Specification of Letters Patent.   Patented Apr. 23, 1912.

Application filed June 7, 1909. Serial No. 500,626.

*To all whom it may concern:*

Be it known that I, WALTER I. SEYMOUR, of Chicago, in the county of Cook, in the State of Illinois, have invented new and useful Improvements in Methods of Making Bifocal-Lens Blanks, of which the following, taken in connection with the accompanying drawings, is a full, clear, and exact description.

This invention relates to certain improvements in the method of making bifocal lens blanks and refers more particularly to the art of uniting by welding two or more layers or bodies of glass differing in kind or index to form the blank from which the lens is to be ground and cut in the usual manner.

In my Patent No. 914,316 I have disclosed a method of forming bifocal lenses in which the layers or bodies of glass are united by fusion at the same temperature on the blow pipe and then partially formed in a suitable mold, while in my pending application No. 493,974, filed May 4, 1909, I have also shown and described a method of making bifocal lenses consisting in uniting the glasses of a different kind or index together by allowing the plastic layers to rest one upon the other and upon a suitable mold so as to take the form of such mold by their own gravity.

The subject matter of my present application is an improvement upon the methods shown in the patent and application above referred to in that it contemplates the uniting of two or more layers of glass of different index such as lead glass and crown glass by first blowing one plastic layer against the curved dies of a mold and then blowing the other plastic layer against the first formed layer in such manner that only a comparatively small portion of the lead glass remains inseparably united to the crown glass, the rest being broken away, thereby economizing materially in time and labor necessary in grinding or finishing the blank to the desired contour for the lens. This result is accomplished by first blowing or pressing one thin layer, as lead glass, against the inner surface of the mold and then immediately afterward, while the first layer is still softened by heat, then heating a second layer of crown glass to softness under a different degree of temperature from that of the lead glass and blowing the softened crown glass against the inner surface of the first named layer, whereby the two layers become welded at their points of contact, suitable chambers being provided around the die or dies of the mold into which portions of the outer layer, or lead glass, are deflected to such an extent as to lie beyond the plane of contact of the layer of crown glass with the high points of the mold, leaving an intervening space between such points of contact, which allows the thinner layer of lead glass to be readily broken away, thereby leaving only a comparatively small portion of the lead glass inseparably united to the crown glass.

My main object is to unite these layers of glass while at different temperatures within a suitable mold by air pressure, as "blowing", one layer across and against the surface or surfaces of one or more dies of suitable contour and then similarly pressing or blowing the other layer against the high points of the first named layer while the latter is still in the plastic state, thereby trapping the air in the space surrounding the points of contact and separating the parts of the layers adjacent such space so that when the united layers are removed from the mold and annealed, the portions of the lead glass layer inclosing the air spaces may be readily broken away leaving a comparatively small but clean cut disk of such lead glass inseparably united to the crown glass, thus removing a considerable surplus of the glass from the blank and materially reducing the time and labor required to grind such blank to the desired contour for the finished lens.

Other objects and uses will be brought out in the following description:

In the drawings—Figure 1 is a horizontal sectional view of a multisided mold showing the two cylindrical layers of glass as united at the high points of the mold, ready to be removed for the annealing process. Fig. 2 is a vertical sectional view of the same mold. Fig. 3 is a plan of one of the lens blanks before the surplus lead glass has been broken away. Fig. 4 is a sectional view taken on line 4—4, Fig. 3. Fig. 5 is a plan of one of the lens blanks after the surplus lead glass has been broken away. Fig. 6 is a sectional view of the finished lens, the dotted lines indicating the section taken on line 6—6, Fig. 5.

The mold shown in Figs. 1 and 2 comprises a series of sections —1— arranged edge to edge about a common center and hinged together at their meeting edges by hinge pins —2— which are removable to permit the sections to be separated one from the other sufficiently to allow the molded cylindrical layers of glass to be removed.

Each section is provided with one or more (in this instance two) inwardly projecting studs or dies —3— having smooth convex inner faces —4— of predetermined radius or contour, depending upon the curvature required in the finished lens, each die being isolated from the others by surrounding chamber —5— which is inclosed by a suitable housing or partition —6— having a somewhat sharp or V-shaped inner edge lying in nearly the same plane as the curved surface —4—. Each die —4— is, therefore, surrounded by a housing or partition —6— spaced apart therefrom to form the intervening chamber —5— and may be either circular in form, as shown at the center or left hand, Fig. 2, or may be rectangular as shown at the right of said figure, the size of the housing determining the size of the lens blank.

The dies —3— may be located centrally of the respective housings, as shown at the left of Fig. 2, or may be located eccentrically, as shown at the center and right of the same figure, the location of such die determining the point of union of the two layers which are to form the lens blank.

The mold sections —1— may be made of cast iron or any other suitable material, but the dies —3— are usually made of separate pieces of metal and their inner faces smoothly polished or ground to the desired contour to give the sections of the blank the desired curvature in the finished lens.

The base of each housing is provided with one or more air vents —7— communicating with the chambers —3— to permit the escape of air therefrom during the formation or blowing of the lead glass against the surfaces of the dies —3—.

The process consists in first gathering upon the blow pipe a suitable quantity of previously melted lead glass, then inserting it into the mold and quickly blowing or expanding it against the inner sides of the mold with sufficient pressure to cause portions of the glass to press against and assume the same contour as the faces —4— of the dies —3—, and at the same time to cause other portions to impinge against the knife edges of the partitions —6—, the portions of the glass between the die and surrounding housing being depressed into the chambers —5—, such depression being readily admitted by the escape of air from said chambers through the ports —7—. This operation produces a comparatively thin glass cylinder or multisided body comprising one layer of a number of lens blanks corresponding to the number of dies and housings, each blank comprising a concavo-convex disk —8— having depressed marginal edges —9—, the disk —8— consisting of that portion of the glass which is coextensive with the area of the die surface —4—, while the marginal portion —9— comprises that portion which lies between the partition —6— and periphery of the die. As soon as this first layer of lead glass is properly distributed over the inner surfaces of the dies and housings of the mold, the portion attached to the blow pipe is broken off in a manner well known to those skilled in the art, leaving the upper end of the glass cylinder open.

Immediately upon the breaking away of the upper portion of the lead glass cylinder, and while the latter is still in a softened condition, a second body of previously melted crown glass is gathered upon the end of another blow pipe and immediately inserted into the lead glass cylinder and expanded against the inner sides thereof in such manner as to press evenly against the high points thereof, or rather against the disks —8— and portions immediately adjacent the knife edges of the partitions or housings —6—. During this last operation the crown glass cylinder which assumed a cylindrical form first contacts with the high points or sections of the disks —8— and gradually increases its area of contact from the center toward the periphery, thereby gradually expelling the air and forming a smooth and perfect welding between the two layers, and as this inner cylinder of crown glass continues to expand, it contacts with the high points at the inner edges of the partitions —6—, thereby trapping the air and forming air chambers between portions of the adjacent layers in registration with the chambers —5—. After the inner layer or cylinder of crown glass has been pressed or expanded by blowing against the high points of the outer cylindrical layer of lead glass, these two layers become inseparably welded at such points, and by separating the sections —1— of the mold in the manner previously described, the cylinders may be removed while the inner cylinder is still attached to the blow pipe and subjected to the annealing process, which is well known in this art, and the unwelded portions of the lead glass which are separated from the crown glass by the spaces —9— are broken away leaving only the disks —8— inseparably welded to the crown glass.

The somewhat sharp inner bearing edges of the partition or housing —6— form more or less V-shape channels which define the outline of the lens blank and enable said blanks to be easily broken out from the main body on these lines ready to be ground and finished into the form of lenses, as —A—, Fig. 6, in the usual manner, it being understood that the portion of the lead glass surrounding its junction with the crown glass has been previously broken away, thus removing a large part of the surplus lead glass, leaving just enough to permit the desired finish of the lens to give the necessary optical effects in the finished lens. By this method the surfaces of the lens sections are air finished in the simple operation of blowing, and I am thereby enabled to obtain a perfect and flawless union of the two parts without liability of excessive loss by breakage during the process of grinding, this breakage being reduced to a minimum by reason of the fact that the disks are united after being reduced to a plastic condition under different temperatures, thereby avoiding the unequal expansion and contraction incidental to the uniting of similar lens sections by reducing them to a plastic condition under the same temperature.

What I claim is:—

1. The herein described method of making bifocal lens blanks consisting in uniting two bodies of glass differing in kind or index in a suitable mold while such bodies are in a plastic condition and changing the contour of a portion of the uniting surfaces of such bodies while in the mold.

2. The herein described method of making bifocal lens blanks consisting in uniting two bodies of glass differing in kind or index within a suitable mold while such bodies are in a plastic condition and imparting to a portion of the uniting surfaces of the bodies a contour differing from the contour of the remaining portion of such uniting surfaces while the bodies are still in the mold.

3. The herein described method of making bifocal lens blanks consisting in superposing on a body of glass within a suitable mold a second body of glass differing from the first in kind or index and imparting to a portion of the contacting surfaces of said bodies the curvature desired in the finished lenses while both bodies are still in the mold.

4. The herein described method of making bifocal lens blanks consisting in uniting two bodies of glass differing in kind or index while in a plastic condition within a suitable mold, changing the contour of a portion of the uniting surfaces of said bodies while still in the mold and removing by breaking away a portion of one of the layers around their uniting surfaces.

5. The herein described method of making bifocal lens blanks consisting in uniting two bodies of glass differing in kind or index within a suitable mold while said bodies are in a plastic condition, separating portions of said bodies around their uniting surfaces while both bodies are still in the mold and breaking away portions of one of said layers at its points of separation from the other layers.

6. The herein described method of making bifocal lens blanks consisting in uniting portions of two bodies of glass differing in kind or index within a suitable mold while said bodies are in a plastic condition, and separating other portions of said bodies on definite lines surrounding the other contacting portions, and removing by breaking away the portion of one body which is separated from the other body.

7. The herein described method of making bifocal lens blanks consisting in impressing different portions of a body of plastic glass against raised surfaces one within the other in such manner as to cause the intervening portions of such glass to be depressed between such surfaces and afterward impressing another body of glass against the raised surface of the first named body while both bodies are softened by heat and subsequently removing by breaking away the depressed portion of the first named body.

8. The herein described method of making bifocal lens blanks consisting in providing a mold with raised surfaces one surrounding the other and spaced apart therefrom to form an intervening depression, impressing a plastic body of glass against said surface and into the intervening space and afterward impressing another body of glass of different kind or index against the portions of the first body which are impressed against said raised surface.

9. The herein described method of making bifocal lens blanks consisting in providing a mold with contacting surfaces one surrounding the other and leaving an intervening space, blowing a plastic body of glass against said surface and into the intervening space, then blowing another plastic body of glass against the inner contact surface for the two bodies while softened by heat.

10. The herein described process of making bifocal lens blanks consisting in providing a mold with a plurality of sets of contacting surfaces and intervening depressions between those of each set, then blowing a plastic body of glass against the contact surface of each set and into the intervening space, afterward blowing another plastic body of glass against the portions of the first named body which are in contact with said surfaces, and finally breaking away the portions of the first named body which are depressed into the recess.

In witness whereof I have hereunto set my hand this 3rd day of June, 1909.

WALTER I. SEYMOUR.

Witnesses:
SMITH A. HARRIMAN,
DAVID MOORE.

Copies of this patent may be obtained for five cents each, by addressing the "Commissioner of Patents, Washington, D. C."